US008856072B2

(12) United States Patent
Hannsmann et al.

(10) Patent No.: US 8,856,072 B2
(45) Date of Patent: Oct. 7, 2014

(54) METHOD FOR PROVIDING OF CONTENT DATA TO A CLIENT (75) Inventors: Uwe Hannsmann, Tubingen (DE); Thomas Stober, Boblingen (DE); James Scott Jennings, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 10/539,644

(22) PCT Filed: Nov. 25, 2003

(86) PCT No.: PCT/EP03/50892
§ 371 (c)(1),
(2), (4) Date: Jun. 15, 2005

(87) PCT Pub. No.: WO2004/057446
PCT Pub. Date: Jul. 8, 2004

(65) Prior Publication Data
US 2006/0031222 A1    Feb. 9, 2006

(30) Foreign Application Priority Data
Dec. 19, 2002   (EP) .................................... 02102827

(51) Int. Cl.
*G06F 7/00*        (2006.01)
*G06F 17/30*       (2006.01)
*G06Q 20/12*       (2012.01)
*G06F 21/10*       (2013.01)
*H04L 29/06*       (2006.01)

(52) U.S. Cl.
CPC .......... *H04L 63/0428* (2013.01); *G06Q 20/123* (2013.01); *H04L 2463/101* (2013.01); *G06F 21/10* (2013.01); *G06F 2221/0793* (2013.01); *H04L 63/10* (2013.01); *G06Q 20/1235* (2013.01)
USPC ................ 707/620; 705/59; 707/628; 726/29

(58) Field of Classification Search
None
See application file for complete search history.

(56) References Cited

U.S. PATENT DOCUMENTS 6,330,670 B1    12/2001   England et al.
6,457,076 B1 *  9/2002   Cheng et al. .................... 710/36
(Continued)

FOREIGN PATENT DOCUMENTS

JP          10215242        8/1998
JP          200048076       2/2000
(Continued)

OTHER PUBLICATIONS

Abstract and Machine Translation for JP10215242, published on Aug. 11, 1998, 32 pp.
(Continued)

*Primary Examiner* — Ann Chempakaseril
(74) *Attorney, Agent, or Firm* — David W. Victor; Konrad, Raynes, Davda & Victor LLP (57) ABSTRACT The present invention relates to a method for providing an interoperable digital rights management system for content data on a client based on synchronization technology, the method comprising the steps of: —receiving of a selection of content data from the, client, —generating of an XML file having a defined DTD format, the XML file comprising license information and a locator for the content data, —sending of the XML file to the client, synchronizing any license status relates data produced on the client back to the server.

21 Claims, 4 Drawing Sheets

(56) References Cited

U.S. PATENT DOCUMENTS

| | | | |
|---|---|---|---|
| 6,775,655 | B1 | 8/2004 | Peinado et al. |
| 6,857,071 | B1 | 2/2005 | Nakae |
| 6,915,425 | B2 | 7/2005 | Xu et al. |
| 7,073,063 | B2 | 7/2006 | Peinado |
| 7,103,574 | B1 | 9/2006 | Peinado et al. |
| 7,203,966 | B2 * | 4/2007 | Abburi et al. .......... 726/29 |
| 2003/0078853 | A1 | 4/2003 | Peinado et al. |
| 2003/0088516 | A1 * | 5/2003 | Remer et al. .......... 705/59 |
| 2006/0212363 | A1 | 9/2006 | Peinado et al. |

FOREIGN PATENT DOCUMENTS

| | | |
|---|---|---|
| JP | 200143269 | 2/2001 |
| JP | 2001134669 | 5/2001 |
| JP | 2003536119 | 12/2003 |
| WO | 0059150 | 10/2000 |
| WO | 0146783 | 6/2001 |

OTHER PUBLICATIONS

Abstract and Machine Translation for JP2000048076, published on Feb. 18, 2000, 67 pp.

Abstract and Machine Translation for JP2001043269, published on Feb. 16, 2001, 61 pp.

Abstract and Machine Translation for JP2001134669, published on May 18, 2001, 21 pp.

Abstract for JP2003536119, published on Dec. 2, 2003, 1 p [Abstract for corresponding case US 6775655].

IDS Report, Dec. 9, 2009, from the Nov. 24, 2009 Office Action for JP2004-561478, 1 p.

Hoshino, H., Y. Atsushi, and K. Hironori, "High-Stratum Rights Description for Rights Protection and Dissemination of Contents", vol. 98, No. 85, IPSJ SIG Notes, Information Processing Society of Japan, Sep. 19, 1998, 14 pp [in Japanese with English Abstract].

Japanese Office Action with Translation, Nov. 24, 2009, for Application No. JP2004-561478, 7 pp.

OMA, "Rights Expression Language Version 1.0", [online], 2002. Retrieved from the Internet at <URL: http://www.openmobilealliance.com/Technical/release_program/docs/DRM/V1_0-20021104-C/OMA-Download-DRMREL-V1_020020913-C.pdf>, 29 pp.

Wang, X., G. Lao, T. Demartini, H. Reddy, M. Nguyen, and E. Valenzuela, "XrML—Extensible Rights Markup Language", ACM 2002, 9 pp.

European Office Action for EP03796053.1 dated Oct. 8, 2010, Total 7 pp.

* cited by examiner

FIG. 1

```
<License>
    <Source>
        <LocURI>www.songsForSale.com</LocURI>          ← 200
    </Source>
    <Target>
        <LocURI>./mp3player/video1</LocURI>           ← 202
    </Target>
    <Meta>                                             ← 204
        <Type xmlns='drm:metinf'>MSFTMediaRightManager</type>
    </Meta>
    <Item>                                             ← 206
        <Source><LocURI>10536681</LocURI></Source>
        <Data>
            <!--The proprietary license data           ← 208
            (key, ...) would be placed here.-->
        </Data>
    </Item>
    <Item>                                             ← 206
        <Source><LocURI>10536682</LocURI></Source>
        <Data>
            <!--The proprietary license data           ← 208
            (key, ...) would be placed here.-->
        </Data>
    </Item>
</License>
<License>
    :
```

METHOD FOR PROVIDING OF CONTENT DATA TO A CLIENT

RELATED APPLICATIONS

This application is a National Stage filing under 35 U.S.C. §371 of International Application No. PCT/EP2003/050892, filed on Nov. 25, 2003, which claims the benefit under 35 U.S.C. 365(b) of European Patent Application No. 02102827.9, filed Dec. 19, 2002.

FIELD OF THE INVENTION

The present invention relates to the field of providing content data to a client, and more particularly without limitation to the management of digital license rights.

BACKGROUND AND PRIOR ART

The digital representation of media content combined with computing and networking technologies provides a powerful way to publish. According to this relatively new mode of publishing, networking technology permits the delivery of digitized media content over a network such as the Internet to end user client computers. Communication protocols define how the digitized media content is exchanged over the network. A media player runs on the end user client computer to allow the user to render the media content.

Digital rights management is a central issue in the on-line commercialization of digital media content data. Digital media content data can promise of video and audio data, images, documents, software and other forms of digital content.

The usual property of digital content is that the publisher (or re-seller) gives or sells the content to a client, but continues to restrict rights to use the content even after the content is under the sole physical control of the client. For instance, a publisher will typically retain copyright to a work so that the client cannot reproduce or publish the work without permission.

A publisher could also adjust pricing according to whether the client is allowed to make a persistent copy, or is just allowed to view the content on-line as it is delivered. These scenarios reveal a peculiar arrangement. The user that possesses the digital content data often does not have full rights to their use; instead, the provider retains at least some of the rights.

A variety of digital rights management systems and methods are known from the prior art which are used to enforce that usage of the content data by the client is within the scope of the license the user has obtained from the publisher.

U.S. Pat. No. 6,330,670 shows a digital rights management operating system which protects rights-managed data, such as downloaded content, from access by untrusted programs while the data is loaded into memory or on a page file as a result of the execution of a trusted application that accesses the memory. To protect the rights-managed data resident in memory, the digital rights management operating system refuses to load an untrusted program into memory while the trusted application is executing or removes the data from memory before loading the untrusted program. This way unauthorised copying of the rights-managed data can be prevented.

U.S. Patent applications 2002/0013772A1 and U.S. 2002/0108049A1 show further digital rights management systems.

Windows® Media Rights Manager® is an end-to-end digital rights management (DRM) system which is commercially available from Microsoft. This system offers content providers and retailers a flexible platform for the secure distribution of digital media files. It lets content providers deliver songs, videos, and other digital media content over the Internet in a protected, encrypted file format and it helps protect digital media (such as songs and videos) by packaging digital media files.

A packaged media file contains a version of a media file that has been encrypted and locked with a key. This packaged file is also bundled with additional information from the content provider. The result is a packaged media file that can only be played by a person who has obtained a license.

One of the problems of digital rights management is that different publishers and content providers use different digital rights management methods. A client device therefore needs to support multiple digital rights management methods to enable a user to obtain and render content data from publishers using different kinds of digital rights management methods.

Another problem related to prior art digital rights management systems is that no renewal of a license can be obtained when the client device is off-line. For example the user has purchased a license which enables him or her to play back the content data a fixed amount of times. When the user is travelling and no network connection is available he or she may use up the acquired license so that no more play back is possible. In this instance the user needs to wait until he or she can reconnect the client device to the network for renewal of the license.

The present invention therefore aims to provide an improved method for providing content data to a client as well as a corresponding computer program and computer system.

SUMMARY OF THE INVENTION

The invention provides for a method for providing of content data to a client which enables usage of multiple digital rights management systems in a generic way. This is accomplished by means of using an XML based document for the exchange of data based on a document type definition (DTD) which defines a format of interchanging digital rights management data independently from a particular digital rights management system a publisher uses.

When the user has purchased a license the corresponding digital rights management data, i.e. the license information, is provided to the client device of the user in the form of an extended markup language (XML) file having the defined DTD format. The client device parses the XML file in order to extract the license information and stores the license information locally. Further the client device uses the locator contained in the XML file to download the content data. The content could also be directly included in the document, depending on the size of it. A rendering application on the client device, such as a windows media player, may then be used to render the content data which has been downloaded.

In accordance with a preferred embodiment of the invention the rendering application checks with the common license client of the client device for license status information. If the desired rendering of the content data is covered by the actual license status the rendering can start and the license status is adapted correspondingly. When the license has expired playback is disabled. The use of the license is recorded by the common license client in the local database.

In accordance with a further preferred embodiment of the invention playback is not disabled when the license has expired but usage of the content data after expiration of the license is tracked and stored in the local license database.

When the client device is re-connected to a network a process is started in order to retroactively pay for the required license rights. This way the user is enabled to still play back content data when the original license has expired and the user has no access to a network connection while travelling. In particular, this enables subscription based business models.

Further preferred embodiments of the present invention are set forth in the dependent claims.

BRIEF DESCRIPTION OF THE DRAWINGS

In the following preferred embodiments of the invention will be described in greater detail by making reference to the drawings in which.

DETAILED DESCRIPTION

Figure 1:
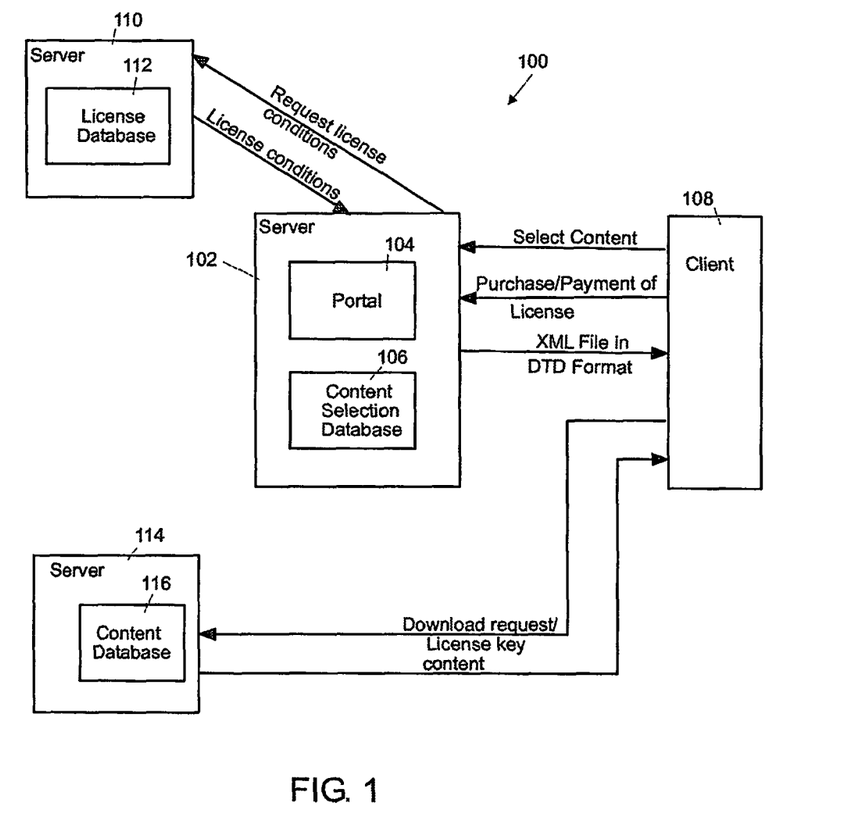
FIG. 1 is a block diagram of an embodiment of a computer system of the invention.

FIG. 1 shows a block diagram of a computer system 100. The computer system 100 has a server computer 102 which implements a web-portal 104. Web-portal 104 provides a platform for the selection of digital content data and purchase of license rights for the usage of such digital content data.

Server computer 102 has content selection database 106 which is coupled to web-portal 104 in order to enable a user to perform database queries for the user's identification and selection of desired content data, such as music, video, images, software or other digital media content data.

The client computer 108 can be coupled to server computer 102 via a computer network, such as the Internet or a wireless network. By means of client computer 108 a user can select content data from the web-portal 104, purchase and pay for licenses and receive digital rights management data, i.e. license information, in the form of an XML file in DTD format. Client computer 108 can be a personal computer, a personal digital assistant, a mobile telephone or another stationary or portable device which can be connected to server computer 102 over a computer network.

Server computer 102 can be coupled to license server 110. License server 110 has license database 112 in which the license conditions of publishers and other providers of digital media content data are stored. Server computer 102 can request such license conditions from license server 110 which queries license database 112 to return the license conditions of a particular digital media content data file to server computer 102.

The digital media content data is stored in content database 116 of content server 114. Client computer 108 can request downloading of a desired content data file from content server 114; it needs to provide a corresponding license key in order to enable the download operation.

The preferred embodiment considered here is particularly advantageous in that a variety of digital rights management methods can be used by server computer 102 without a requirement that client computer 108 supports the exact same digital rights management method. The reason for this kind of flexibility is that the defined DTD format provides a generic and common way for interchanging of digital rights management data. Irrespective of the particular digital rights methodology which is used by server computer 102, client computer 108 can parse the XML file in the DTD format in order to extract the required digital rights management information and protect the content data accordingly.

For details of the DTD grammar reference is made to the XML specification (http://www.w3.org/TR/REC-xml) which is incorporated herein by reference in its entirety.

Figure 2:
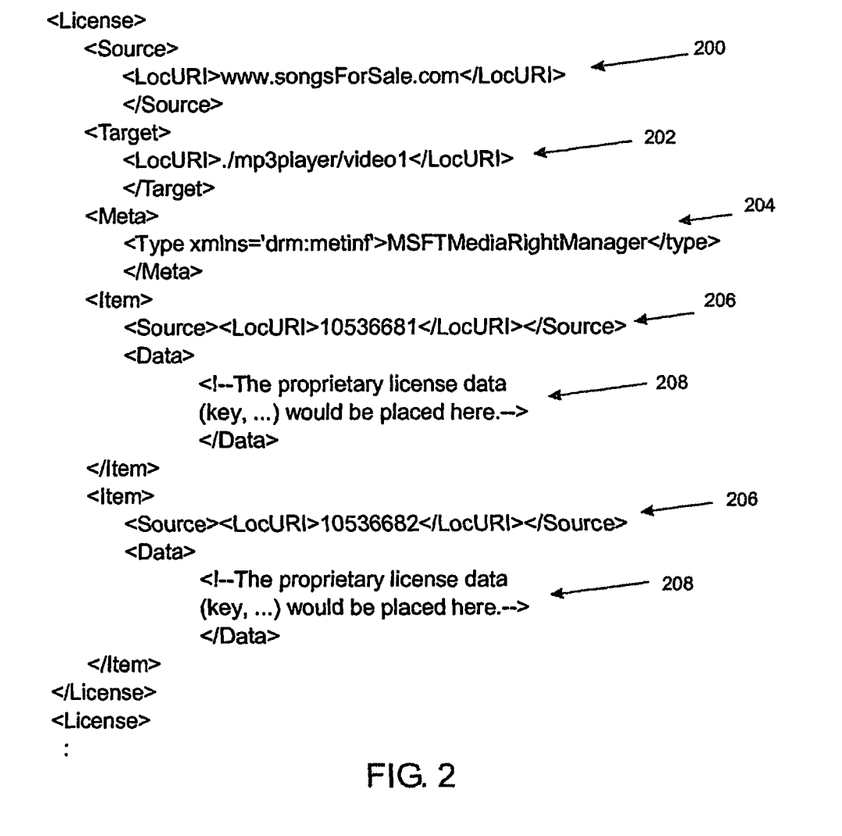
FIG. 2 is an example of an XML file having a defined DTD format for communicating license information to a client device.

FIG. 2 shows an example of an XML file in a pre-defined DTD format which is sent from server computer 102 to client computer 108. Line 200 of the DTD file indicates the 'source', i.e. the content provider which distributes the license information, such as the URL (uniform resource locator) for accessing content database 116 on content server 114. In the example considered here this URL is 'www.songsforsale.com'.

Line 202 of the DTD file provides an indication of the 'target', i.e. a reference to the local rendering application which uses the licensing information. In the example considered here this is the MP3player/video1 rendering application on the client computer 108.

Line 204 indicates the type and/or the format of the embedded license information. In other words line 204 indicates the digital rights management method which is to be used. In the example considered here this is 'MSFTMediaRightManager'.

Line 206 of the DTD file indicates an identifier (ID) of the licensed content data item. By means of this key the 'source' can unambiguously identify the content data. In this example the ID is '10536681'.

Line 208 of the DTD file indicates license information, such as a key required for downloading of the content data or the key required to execute the file on the client, data indicating the scope of the license, i.e. a fixed number of allowed playbacks or a certain duration. Further state information can be included here such as used/unused, valid/expired, . . . .

This can be followed by another line 208 indicating such license information for another content data item with another ID given in a subsequent line 206.

Figure 3:
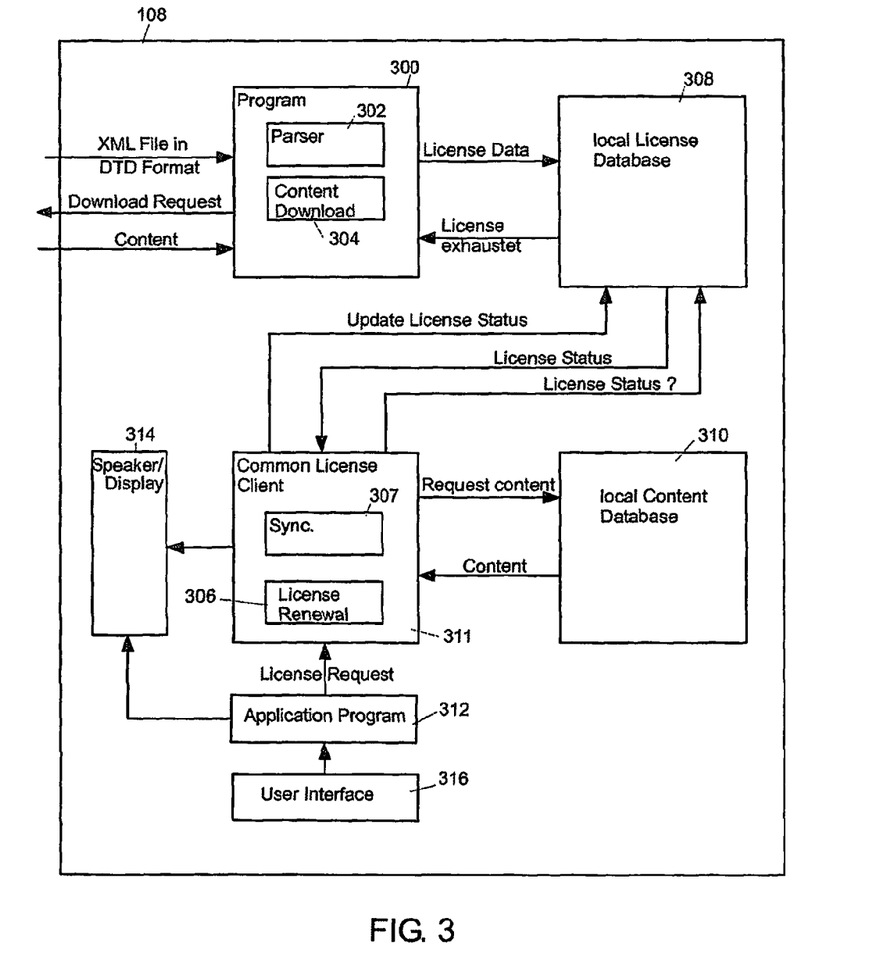
FIG. 3 is a block diagram of a preferred embodiment of a client device in accordance with the invention.

FIG. 3 shows a more detailed block diagram of client computer 108. Client computer 108 has a program module for interfacing of client computer 108 with server computer 102 over a computer network. Program module 300 has a parser 302 for parsing of an XML file in DTD format which has been received from server computer 102 (cf. FIG. 1). Further program module 300 has content download module 304 for requesting download of content data and receiving the content data.

Client computer 108 has a local license database 308 for storing of license information which has been extracted by means of parser 302 from the XML file.

Content data which has been downloaded is stored in local content database 310. Rendering application program 312 can access local content database 300 through common license client 311 for rendering of content data by means of output device 314, such as a speaker or a display. Further client computer 108 has a user interface 316 through which a user can select a content data file from the local content database 310 for rendering by the rendering application 312.

In operation client computer 108 receives an XML file in DTD format from server computer 102 (cf. FIG. 1). The XML file is parsed by parser 302 of program module 300. The license information data extracted by parser 302 from the XML file is stored in local license database 308. The content data is downloaded by means of content download module 304 from the content server (cf. FIG. 1) or can be contained in the same XML document (depending on the size).

The downloaded content data is stored in local content database 310 for later rendering by rendering application 312.

The user can select a particular content data file via user interface 316 for playback. A corresponding request is entered from the user interface 316 into rendering application 312. In response rendering application 312 requests the common license client to check the license status of the requested content data in local license database 308. If the license status is sufficient for playback the content data is returned by the common license client by retrieving it from the local content database 310 and rendered by rendering application 312. If the license status is insufficient for rendering, rendering is disabled.

The digital rights management method indicated in the XML file may allow that a user continues to use the content data even after the original license has been exhausted provided that the amount of usage of the content data after expiration of the original license is tracked and stored by the common license client 311 in local license database 308 for later payment. If such a digital rights management method is specified for the requested content data in local license database 308 application program 312 still renders the content data and stores the amount of usage of the content data in the local license database 308. When the client computer 108 is re-connected to the network license a synchronization of entries which have been made in local license database 308 is performed by means of synchronization module 307 and renewal module 306 is started to renew the license and provide payment for the amount of usage of the content data after expiration of the original license.

This way license renewal module 306 implements an automatic process for renewal of a license which has been previously purchased. Synchronization module 307 can be based on any synchronization technique, such as SyncML.

It is to be noted that a variety of further rendering application programs can be installed. These rendering application programs rely on the common license client 311 for obtaining and updating license status related data.

Figure 4:
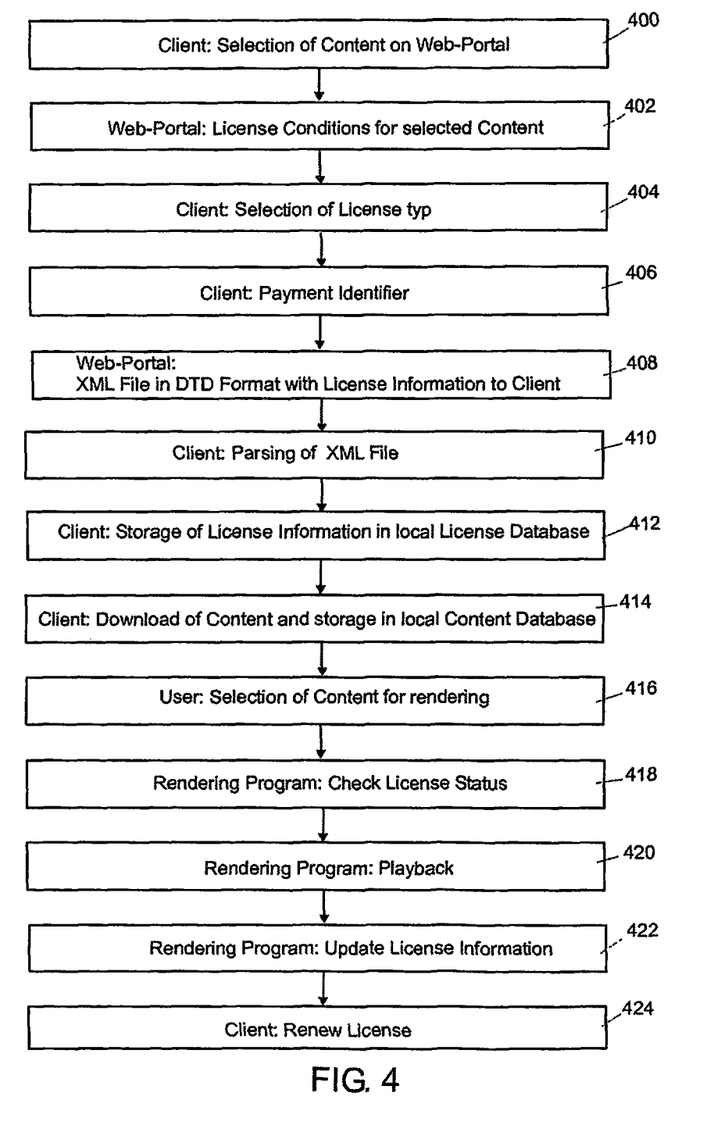
FIG. 4 is illustrative of a flow diagram of an embodiment of a method of the invention.

FIG. 4 is illustrative of a corresponding method. In step 400 a selection of content data is made by means of a client on a web-portal. In step 402 the web-portal requests the license conditions for the selected content data from a license server computer and offers corresponding license options to the client. In step 404 the client selects a certain license type and provides payment in step 406 by inputting of a payment identifier, such as a credit card number.

In step 408 the web-portal generates an XML file in a pre-defined DTD format containing the license information. The XML file is transmitted to the client.

In step 410 the client parses the XML file and stores the extracted license information in its local license database in step 412. In step 414 the content data is downloaded by the client by means of the license information contained in the XML file and stored in its local content database. In step 416 a user selects certain content data which has been downloaded for rendering. In response a corresponding rendering application program checks the license status of the content data to be rendered in step 418.

Depending on the license status rendering is started in step 420. In step 422 the rendering application program updates the license information stored in the local license database by calling the common license client API. For example if the license encompasses the fixed number of playbacks of the content data the remaining number of playbacks is decremented accordingly by the common license client. When the license has been used up renewal of the license is requested in step 424 from the client.

A corresponding request is sent to the web-portal and an additional XML file is received by the client for renewal of the license. This renewal of the license can be performed in response to a corresponding request of the user or it can be triggered automatically when the original license has expired depending on the settings which have been chosen by the user.

LIST OF REFERENCE NUMERALS

| | |
|---|---|
| computer system | 100 |
| server computer | 102 |
| web-portal | 104 |
| consistent selection database | 106 |
| client computer | 108 |
| license server | 110 |
| license database | 112 |
| content server | 114 |
| content database | 116 |
| line | 200 |
| line | 202 |
| line | 204 |
| line | 206 |
| line | 208 |
| program module | 300 |
| parser | 302 |
| content download module | 304 |
| license renewal module | 306 |
| synchronization module | 307 |
| local license database | 308 |
| local content database | 310 |
| common license client | 311 |
| rendering application | 312 |
| output device | 314 |
| user interface | 316 |

The invention claimed is:

1. A method for providing of content data at a client, comprising:

transmitting a selection of content data to a server;

receiving, from the server, a file comprising license information and a locator for the content data, wherein the license information indicates a license status enabling the client to access the content data, wherein the license status indicates available content usage, wherein the available content usage indicates an amount of the content available to the client according to a scope of a license;

receiving selection of the content data;

determining whether the available content usage in the license status indicates that access to the content data is permitted;

providing access to the content data in response to determining that the available content usage permits access;

decrementing the available content usage included in the file sent to the client by an amount of actual client usage of the content data at the client in response to providing access to the content data;

permitting access to the content data in response to determining that the available content usage in the license status indicates that the license has expired;

tracking content usage in response to determining that the available content usage indicates that the license has expired and permitting access to the content data after the license has expired;

synchronizing with the server to transmit the tracked amount of usage of the content data at the client after the license status is expired at the client; and providing payment for the amount of usage of the content data after the license status is expired.

2. The method of claim 1, wherein the generated file comprises an XML file having a defined DTD format.

3. The method of claim 1, further comprising:
sending, by the client, to the server a request to renew the license and make payment for the renewal in response to the client determining that the available content usage in the license status indicates that the license has expired.

4. The method of claim 1, wherein the available content usage indicates a fixed number of allowed playbacks, wherein the license status is expired after the content is rendered the fixed number of allowed playbacks.

5. The method of claim 1, wherein the available content usage indicates a duration of the content playback.

6. A client in communication with a server to access content data, wherein the client includes a computer programmed to perform operations, the operations comprising:
transmitting a selection of content data to the server;
receiving, from the server, a file comprising license information and a locator for the content data, wherein the license information indicates a license status enabling the client to access the content data, wherein the license status indicates available content usage, wherein the available content usage indicates an amount of the content available to the client according to a scope of a license;
receiving selection of the content data;
determining whether the available content usage in the license status indicates that access to the content data is permitted;
providing access to the content data in response to determining that the available content usage permits access;
decrementing the available content usage included in the file sent to the client reduced by an amount of actual client usage of the content data at the client in response to providing access to the content data;
permitting access to the content data in res onse to determinin that the available content usage in the license status indicates that the license has expired;
tracking content usage in response to determining that the available content usage indicates that the license has expired and permitting access to the content data after the license has expired;
synchronizing with the server to transmit the tracked amount of usage of the content data at the client after the license status is expired at the client; and
providing payment for the amount of usage of the content data after the license status is expired.

7. The client of claim 6, wherein the generated file comprises an XML file having a defined DTD format.

8. The client of claim 6, wherein the operations further comprise:
sending, by the client, to the server a request to renew the license and make payment for the renewal in response to the client determining that the available content usage in the license status indicates that the license has expired.

9. The client of claim 6, wherein the available content usage indicates a fixed number of allowed playbacks, wherein the license status is expired after the content is rendered the fixed number of allowed playbacks.

10. The client of claim 6, wherein the available content usage indicates a duration of the content playback.

11. A digital storage medium including a computer program executed at a client to access content data and communicate with a server, wherein the computer program is capable of causing the server to perform operations comprising:
transmitting a selection of content data to the server;
receiving, from the server, a file comprising license information and a locator for the content data, wherein the license information indicates a license status enabling the client to access the content data, wherein the license status indicates available content usage, wherein the available content usage indicates an amount of the content available to the client according to a scope of a license;
receiving selection of the content data;
determining whether the available content usage in the license status indicates that access to the content data is permitted;
providing access to the content data in response to determining that the available content usage permits access;
decrementing the available content usage included in the file sent to the client reduced by an amount of actual client usage of the content data at the client in response to providing access to the content data;
permitting access to the content data in response to determining that the available content usage in the license status indicates that the license has expired;
tracking content usage in response to determining that the available content usage indicates that the license has expired and permitting access to the content data after the license has expired;
synchronizing with the server to transmit the tracked amount of usage of the content data at the client after the license status is expired at the client; and
providing payment for the amount of usage of the content data after the license status is expired.

12. The digital storage medium of claim 11, wherein the generated file comprises an XML file having a defined DTD format.

13. The digital storage medium of claim 11, wherein the operations further comprise:
sending, by the client, to the server a request to renew the license from and make payment for the renewal in response to the client determining that the available content usage in the license status indicates that the license has expired.

14. The digital storage medium of claim 11, wherein the available content usage indicates a fixed number of allowed playbacks, wherein the license status is expired after the content is rendered the fixed number of allowed playbacks.

15. The digital storage medium of claim 11, wherein the available content usage indicates a duration of the content playback.

16. The method of claim 1, wherein access to the content data in response to determining that the available content usage in the license status indicates that the license has expired is permitted in response to the client not being able to connect to the server, and wherein the synchronization occurs when the client is able to reconnect to the server.

17. The method of claim 1, further comprising:
determining whether the file permits the user to continue to use the content data after the license has expired, wherein the operations of permitting access to the content data in response to determining that the license has expired and tracking content usage is performed in response to determining that the file permits the user to continue to use the content data after the license has expired.

18. The client of claim 6, wherein access to the content data in response to determining that the available content usage in the license status indicates that the license has expired is permitted in response to the client not being able to connect to the server, and wherein the synchronization occurs when the client is able to reconnect to the server.

19. The client of claim 6, wherein the operations further comprise:
  determining whether the file permits the user to continue to use the content data after the license has expired, wherein the operations of permitting access to the content data in response to determining that the license has expired and tracking content usage is performed in response to determining that the file permits the user to continue to use the content data after the license has expired.

20. The digital storage medium of claim 11, wherein access to the content data in response to determining that the available content usage in the license status indicates that the license has expired is permitted in response to the client not being able to connect to the server, and wherein the synchronization occurs when the client is able to reconnect to the server.

21. The digital storage medium of claim 11, wherein the operations further comprise:
  determining whether the file permits the user to continue to use the content data after the license has expired, wherein the operations of permitting access to the content data in response to determining that the license has expired and tracking content usage is performed in response to determining that the file permits the user to continue to use the content data after the license has expired.

* * * * *